US006943332B2

United States Patent
Suzuki (10) Patent No.: US 6,943,332 B2
(45) Date of Patent: Sep. 13, 2005

(54) LASER MICROSCOPE AND IRRADIATING METHOD

(75) Inventor: Motohiko Suzuki, Kawasaki (JP)

(73) Assignee: Olympus Optical Co., Ltd., Tokyo (JP)

( * ) Notice: Subject to any disclaimer, the term of this patent is extended or adjusted under 35 U.S.C. 154(b) by 301 days.

(21) Appl. No.: 10/441,611

(22) Filed: May 20, 2003

(65) Prior Publication Data

US 2003/0218114 A1 Nov. 27, 2003

(30) Foreign Application Priority Data

May 23, 2002 (JP) ........................................ 2002-149654

(51) Int. Cl.[7] ............................................... G02B 7/04
(52) U.S. Cl. ................................... 250/201.3; 250/205
(58) Field of Search ............................. 250/201.3, 205, 250/226, 237 R, 548, 458.1, 306, 307; 359/385

(56) References Cited

U.S. PATENT DOCUMENTS 5,034,613 A    7/1991    Denk et al.

6,538,723 B2 *  3/2003   Hagiwara et al. ............. 355/67

FOREIGN PATENT DOCUMENTS

JP    2000-019432 A    1/2000

* cited by examiner

*Primary Examiner*—Que T. Le
(74) *Attorney, Agent, or Firm*—Frishauf, Holtz, Goodman & Chick, P.C.

(57) ABSTRACT

A laser microscope includes a pulse laser which generates irradiation light having a pulse string, a laser scanner which irradiates a specimen by scanning the irradiation light on the specimen, a detector which detects emitted light generated from the specimen, a shutter which is inserted in an optical path of the irradiation light, and intercepts and transmits the irradiation light for a time period shorter than a scanning time during which a small region on the specimen is scanned, wherein the detector obtains a light amount for each scanning time, and a controller which controls the shutter to intercept a predetermined number of pulses of the pulse string of the irradiation light for each scanning time.

21 Claims, 7 Drawing Sheets

LASER MICROSCOPE AND IRRADIATING METHOD

CROSS-REFERENCE TO RELATED APPLICATIONS

This application is based upon and claims the benefit of priority from the prior Japanese Patent Application No. 2002-149654, filed May 23, 2002, the entire contents of which are incorporated herein by reference.

BACKGROUND OF THE INVENTION

1. Field of the Invention

The present invention relates to a laser microscope and, more particularly, to a multi-photon excitation laser microscope using an ultra short pulse laser as excitation light.

2. Description of the Related Art

In the field of biology, a multi-photon excitation laser microscope is often used. This is so because a clear fluorescent image of a deep portion of a specimen can be obtained by tomography by using this multi-photon excitation laser microscope. On the other hand, when live cells are to be observed with a laser microscope, it is desirable to minimize the amount of laser beam with which the specimen is irradiated, in order to prevent damages to the specimen.

A general method of adjusting the amount of laser beam is to use an ND filter. A technique which stabilizes the illumination light amount and increases the repeatability of transmissivity is known (Jpn. Pat. Appln. KOKAI Publication No. 2000-19432).

To generate fluorescence by multi-photon excitation, multi-photons must be absorbed by a fluorescent dye of a specimen, but the multi-photon absorption probability is small. Therefore, the amount of laser beam must be increased to obtain a necessary fluorescence amount for observation. Unfortunately, if the amount of laser beam is increased, a fluorescent substance of a specimen readily causes photobleaching, and this makes long-time observation difficult. Also, this increases the possibility of the specimen being damaged by the laser beam energy.

Accordingly, in any multi-photon excitation laser microscope, the laser beam must therefore have a peak power large enough to achieve multi-photon absorption and an average power small enough to lessen the damage to specimens.

A relationship indicated by $$F_n \propto A_n \propto I^n \quad (1)$$

holds between an n-photon excitation fluorescence amount $F_n$, n-photon absorption probability $A_n$, and excitation light intensity I.

That is, when the excitation light intensity I is doubled, the n-photon excitation fluorescence amount $F_n$ and probability $A_n$ increase by $2^n$ times. When the excitation light intensity I is halved, the n-photon excitation fluorescence amount $F_n$ and probability $A_n$ reduce by $1/2^n$ times.

For example, if the laser beam intensity is reduced to 50% (=½) in order to suppress damages to a live cell, the excitation fluorescence amount becomes 25% (=¼) in 2-photon excitation. On the other hand, to perform observation with an excitation fluorescence amount of 50%, the laser beam intensity is set to about 70% in 2-photon excitation.

BRIEF SUMMARY OF THE INVENTION

A laser microscope according to an aspect of the present invention comprises a pulse laser which generates irradiation light having a pulse string; a laser scanner which irradiates a specimen by scanning the irradiation light on the specimen; a detector which detects emitted light generated from the specimen; a shutter which is inserted in an optical path of the irradiation light, and intercepts and transmits the irradiation light for a time period shorter than a scanning time during which a small region on the specimen is scanned, wherein the detector obtains a light amount for each scanning time; and a controller which controls the shutter to intercept a predetermined number of pulses of the pulse string of the irradiation light for each scanning time.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
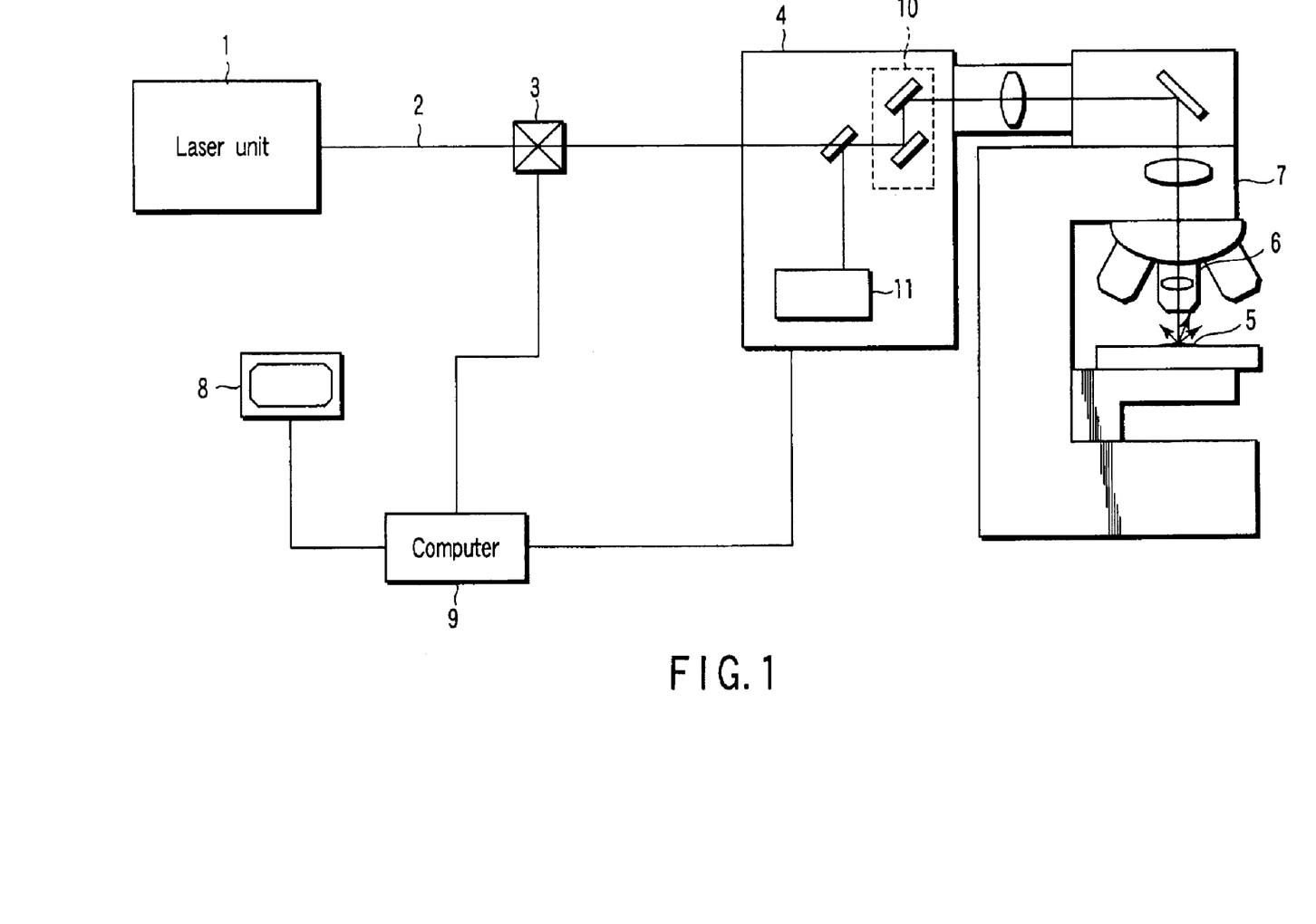
FIG. 1 is a block diagram showing the first embodiment of a laser microscope according to the present invention.

FIG. 1 is a block diagram showing the first embodiment of a laser microscope according to the present invention.

This laser microscope according to the present invention includes a laser unit 1, high-speed shutter 3, laser scanner 4, microscope 7, monitor 8, and computer 9.

The laser unit 1 emits an ultra short pulse laser. The high-speed shutter 3 transmits and intercepts a laser beam 2. The laser scanner 4 scans the laser beam 2. The microscope 7 has an objective lens 6 for observing a specimen 5. The monitor 8 displays an observed image. The computer 9 controls the operation of the laser microscope.

The laser scanner 4 contains a galvanometer mirror 10 and photoelectric converter 11.

The galvanometer mirror 10 is a mechanism for scanning the laser beam 2. The photoelectric converter 11 converts fluorescence generated by the specimen 5 into an electrical signal.

The computer 9 is connected to the high-speed shutter 3, galvanometer mirror 10, and photoelectric converter 11 by signal lines.

The laser unit 1 used in this embodiment is a pulse laser having a pulse width of several tens to several hundreds of femtoseconds (fs), and a pulse repetitive frequency of several tens to several hundreds of MHz.

The operation of the laser microscope having the above arrangement will be explained below.

The ultra short pulse laser 2 emitted from the laser unit 1 enters the high-speed shutter 3. On the basis of a command from the computer 9, the high-speed shutter 3 performs an ON-OFF switching operation by a predetermined sequence, thereby intercepting a portion of a pulse string of the laser beam 2.

The travelling direction of the laser beam 2 passing through the high-speed shutter 3 is deflected by the galvanometer mirror 10 in the laser scanner 4 so as to scan a two-dimensional plane. The laser beam 2 then enters the microscope 7 and is two-dimensionally scanned on the specimen 5 through the objective lens 6.

On the specimen 5, multi-photon absorption occurs in the focal position of the objective lens 6. This excites fluorescence. The generated fluorescence travels in the optical path opposite to the laser beam 2 through the objective lens 6. After the deflection of the fluorescence is released by the galvanometer mirror 10, the fluorescence enters the photoelectric converter 11.

A signal converted by the photoelectric converter 11 is input to the computer 9. The computer 9 relates a signal indicating the operating state of the galvanometer mirror 10 to the signal from the photoelectric converter 11. The computer 9 then forms a fluorescent image of the specimen 5 and displays this image on the monitor 8.

Figure 2:
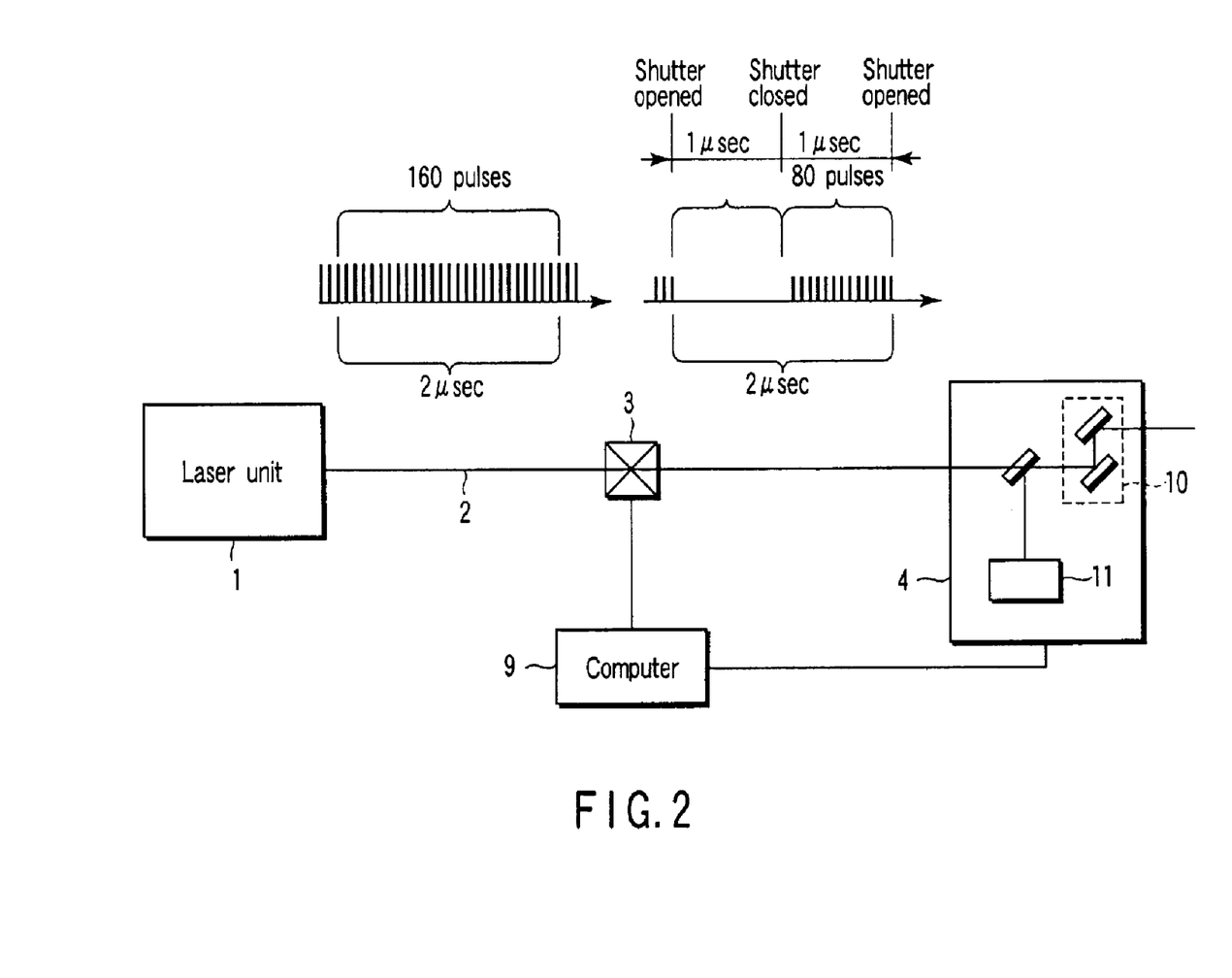
FIG. 2 is a block diagram showing a pulse control method of the laser microscope of the first embodiment.

FIG. 2 is a block diagram showing a pulse control method of the laser microscope of the first embodiment. The same reference numerals as in FIG. 1 denote parts having the same functions in FIG. 2, and a detailed description thereof will be omitted.

Assume that the laser beam 2 emitted from the laser unit 1 has a pulse width of 100 fs (femtoseconds) and a pulse repetitive frequency of 80 MHz. Assume also that the scan speed of the galvanometer mirror 10 is 1 sec per frame, and the data amount of the computer 9 is 800×600=480,000 pixels per frame. Under the conditions, the scanning rate of the galvanometer mirror 10 is about 2 μs per pixel, so the number of laser pulses per pixel is 160 pulses.

By using a peak power $P_p$ and pulse width $\Delta t$ of the laser beam, an n-photon excitation fluorescence amount $F_n$ per pixel generated by the number N of laser pulses per pixel is represented by $$F_n \propto A_n \propto P_p^n \times \Delta t \times N \quad (2)$$

Accordingly, if the high-speed shutter 3 does not intercept the laser beam 2, the n-photon excitation fluorescence amount $F_n$ per pixel generated under the above conditions is represented by $$F_n = P_p^n \times 100 \text{ fs} \times 160 \quad (3)$$

If the high-speed shutter 3 repeats the ON-OFF operation to set the transmission time of the laser beam 2 to 1 μs which is ½ the scanning time of one pixel, the number of laser pulses per pixel is 80. However, the peak power of the laser beam remains unchanged. The n-photon excitation fluorescence amount per pixel generated under the conditions is represented by $$F_n = P_p^n \times 100 \text{ fs} \times 80 \quad (4)$$

Comparison of equations (3) and (4) reveals that the n-photon excitation fluorescence amount changes to ½ when the high-speed shutter 3 performs ON-OFF switching to control the number of laser pulses per pixel. That is, when shutter switching is controlled for each pixel, a fluorescence amount proportional to the open time of the high-speed shutter 3 can be obtained.

In this embodiment, the high-speed shutter 3 repeatedly intercepts and transmits the laser beam 2. However, the high-speed shutter 3 need not transmit 100% of the laser beam 2.

In a transmitted light amount adjusting system using an ND filter as one conventional technique, the excitation fluorescence amount largely changes when the peak power is changed. This makes observation difficult to perform while damages to live cells are minimized. The present invention solves this problem by changing the number of pulses. Therefore, the high-speed shutter 3 need only be a means capable of changing the number of pulses. This solves the problem even if the transmissivity of the laser beam 2 is not 100%.

The present invention can be summarized as follows.

Generally, the fluorescence amount $F_n$ generated in a laser microscope using a pulse laser is represented by expression (2). That is, the fluorescence amount $F_n$ can be controlled by changing the peak power $P_p$ of the laser beam and the number N of laser pulses. The n-photon absorption probability $A_n$ is proportional to the nth power of the peak power $P_p$ of the laser beam and to the number N of laser pulses. On the other hand, damage which a specimen receives from the laser beam depends on the laser beam energy, i.e., the time integral value of the power.

Accordingly, the number N of laser pulses is changed while the laser beam peak power $P_p$ is held constant. This allows efficient fluorescence observation while damages to a specimen are reduced.

Figure 3:
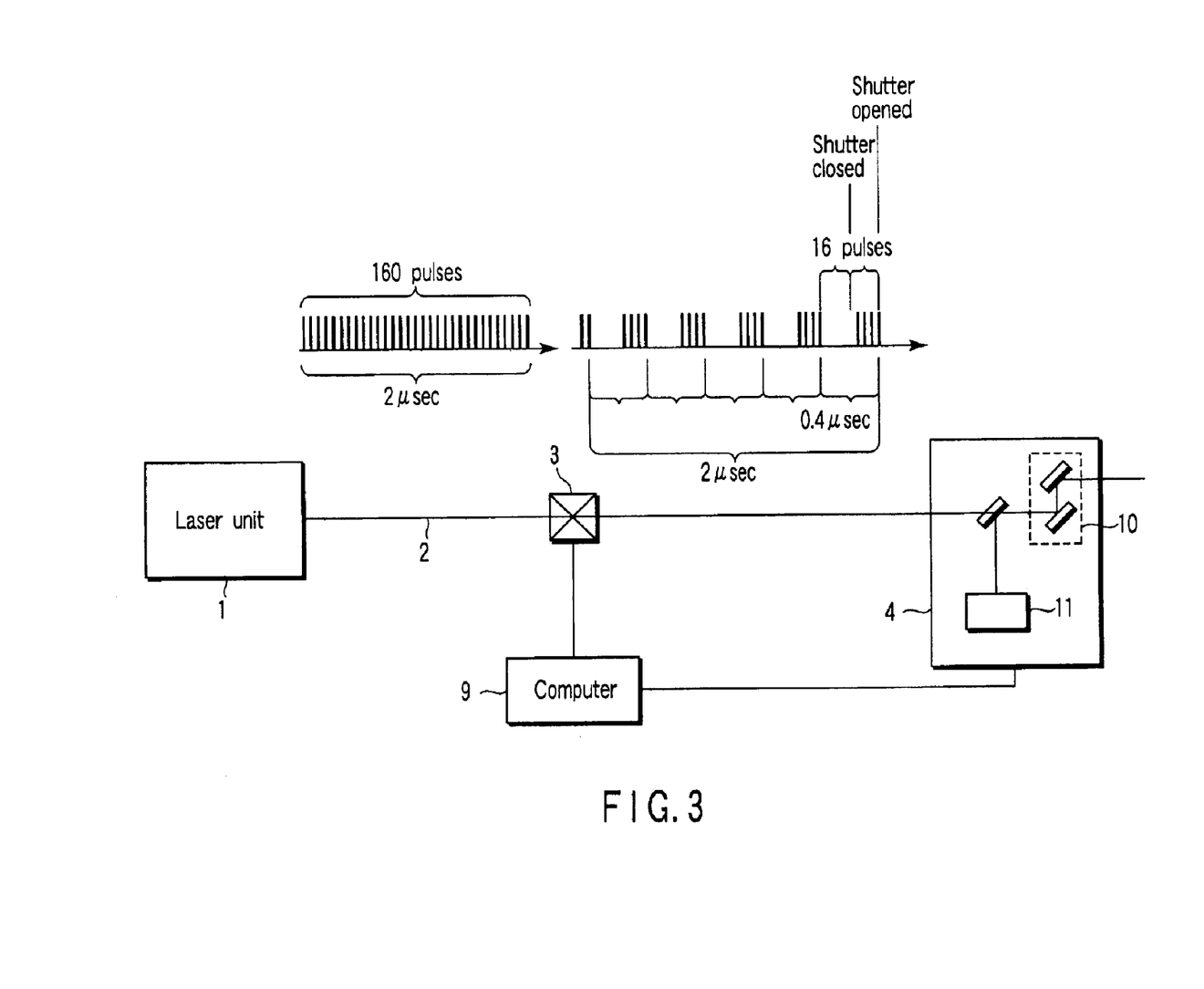
FIG. 3 is a block diagram showing another pulse control method of the laser microscope of the first embodiment.

FIG. 3 is a block diagram showing another pulse control method of the laser microscope of the first embodiment. The same reference numerals as in FIG. 1 denote parts having the same functions in FIG. 3, and a detailed explanation thereof will be omitted.

In this embodiment, data of one pixel is separately acquired several times, and the mean value or sum of the acquired fluorescence amounts is used as the data of the pixel. This cancels fluorescence amount measurement errors caused by laser intensity fluctuations.

Similar to FIG. 1, assume that the laser beam 2 emitted from the laser unit 1 has a pulse width of 100 fs (femtoseconds) and a pulse repetitive frequency of 80 MHz. Assume also that the scan speed of the galvanometer mirror 10 is 1 sec per frame, and the data amount of the computer 9 is 800×600=480,000 pixels per frame. Under the conditions, the scanning rate of the galvanometer mirror 10 is about 2 μs per pixel, so the number of laser pulses per pixel is 160 pulses.

If the data storage time of the photoelectric converter 11 is 0.4 μs, the number of times of data acquisition per pixel is 5, so the number of laser pulses per data acquisition time is 32 pulses.

The n-photon excitation fluorescence amount $F_n$ per pixel is approximated by $$F_n \propto P_p^n \times \Delta t \times Na \times D \quad (5)$$

by using the peak power $P_p$ and pulse width $\Delta t$ of the laser beam, the number D of times of data acquisition per pixel, and the number Na of laser pulses per data acquisition time.

Accordingly, if the high-speed shutter 3 does not intercept the laser beam 2, the n-photon excitation fluorescence amount $F_n$ per pixel generated under the above conditions is represented by $$F_n=P_p{}^n \times 100 \text{ fs} \times 32 \times 5 \qquad (6)$$

If the high-speed shutter 3 repeats the ON-OFF operation to set the transmission time of the laser beam 2 to 0.2 μs which is ½ the data storage time, the number of laser pulses per data acquisition time is 16. However, since the peak power of the laser beam remains unchanged, the n-photon excitation fluorescence amount $F_n$ per pixel generated under the conditions is represented by $$F_n=P_p{}^n \times 100 \text{ fs} \times 16 \times 5 \qquad (7)$$

Comparison of equations (6) and (7) reveals that the n-photon excitation fluorescence amount $F_n$ changes to ½ when the high-speed shutter 3 performs ON-OFF switching to control the number of laser pulses per data acquisition time. That is, when shutter switching is controlled for each data acquisition time, a fluorescence amount proportional to the open time of the high-speed shutter 3 can be obtained.

The computer 9 acquires D data for one pixel, and sets the mean value or sum of these data as the n-photon excitation fluorescence amount $F_n$ of this pixel. On the basis of this data, the computer 9 forms a fluorescent image and displays the image on the monitor 8.

Figure 4:
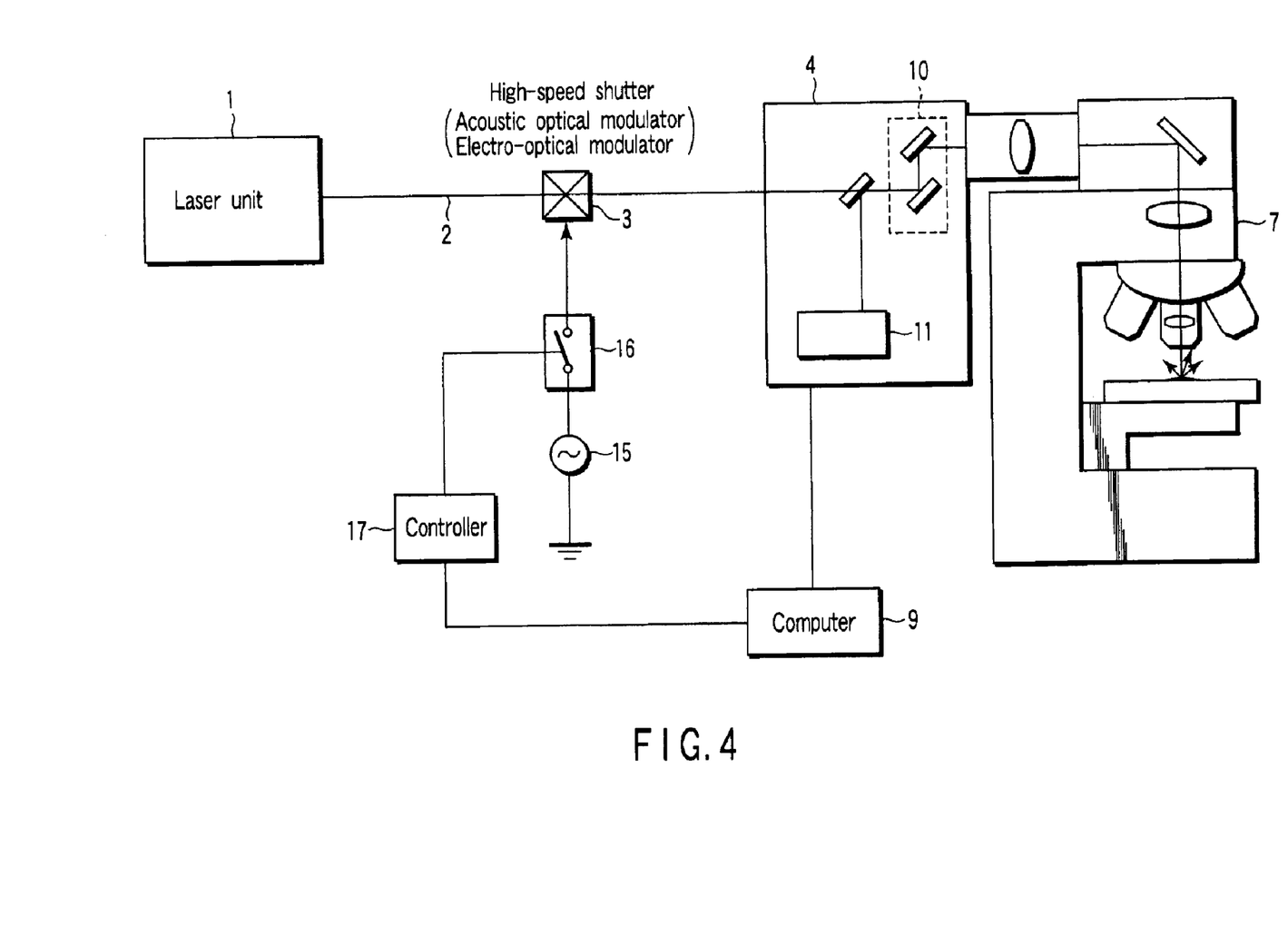
FIG. 4 is a block diagram showing another embodiment of the laser microscope according to the present invention.

FIG. 4 is a block diagram showing the second embodiment of the laser microscope according to the present invention. The same reference numerals as in FIG. 1 denote parts having the same functions in FIG. 4, and a detailed description thereof will be omitted.

In this embodiment, an acoustic optical modulator or electro-optical modulator is used as a high-speed shutter 3, and an opening/closing operation is performed by generating diffraction or birefringence in this modulator by a driving device 15 and switching device 16.

The driving device 15 is chosen in accordance with the type of modulator used as the high-speed shutter 3. For example, when the acoustic optical modulator is used, a carrier wave source is used as the driving device 15. When the electro-optical modulator is used, a voltage source for applying an electric field is used as the driving device 15.

A computer 9 transmits information for designating, e.g., the scan speed, the number of pixels, and the excitation light intensity to a controller 17. On the basis of this designation information, the controller 17 determines a switching operation of the high-speed shutter 3, and controls the operation of the switching device.

In the second embodiment, a high-speed opening/closing operation can be performed because the high-speed shutter 3 has no mechanical driving portion.

Note that the ON-OFF timing of the high-speed shutter 3 need only be shorter than the scanning time per pixel. For example, when one frame of 1,000-dot×500-line image data is to be acquired once per sec by one-way scan, the scanning time per line is 1 ms, and the scanning time per dot is 1 μs. Accordingly, if the high-speed shutter 3 is switched on and off in units of 0.5 μs, the intensity of a laser beam 2 from a laser unit 1 can be reduced to ½.

"One-way scan" is a method in which, when the laser beam 2 is scanned forward and backward, pixel data is acquired only one way (forward), and no data acquisition is performed backward.

Figure 5:
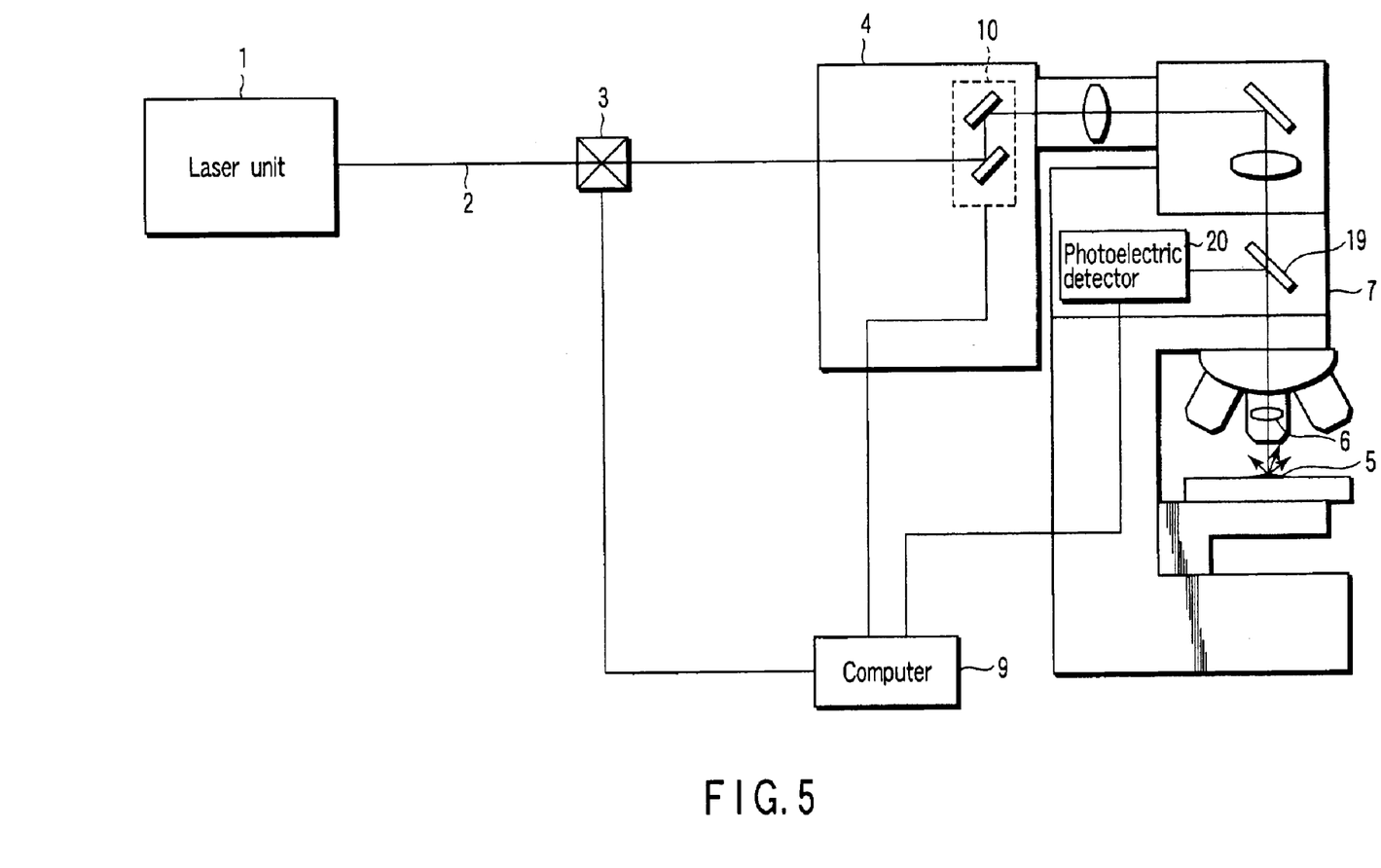
FIG. 5 is a block diagram showing still another embodiment of the laser microscope according to the present invention.

FIG. 5 is a block diagram showing the third embodiment of the laser microscope according to the present invention. The same reference numerals as in FIG. 1 denote parts having the same functions in FIG. 5, and a detailed description thereof will be omitted.

In this embodiment, fluorescence generated from a specimen 5 is detected by a photoelectric detector 20 via a dichroic mirror 19 placed between an objective lens 6 and laser scanner 4.

The photoelectric detector 20 may also be placed in the conjugate position of an image or in the conjugate position of the objective lens pupil.

In the third embodiment, weak fluorescence can be efficiently detected without any scanning optical system.

The fourth embodiment of the laser microscope according to the present invention will be explained below.

Figure 6:
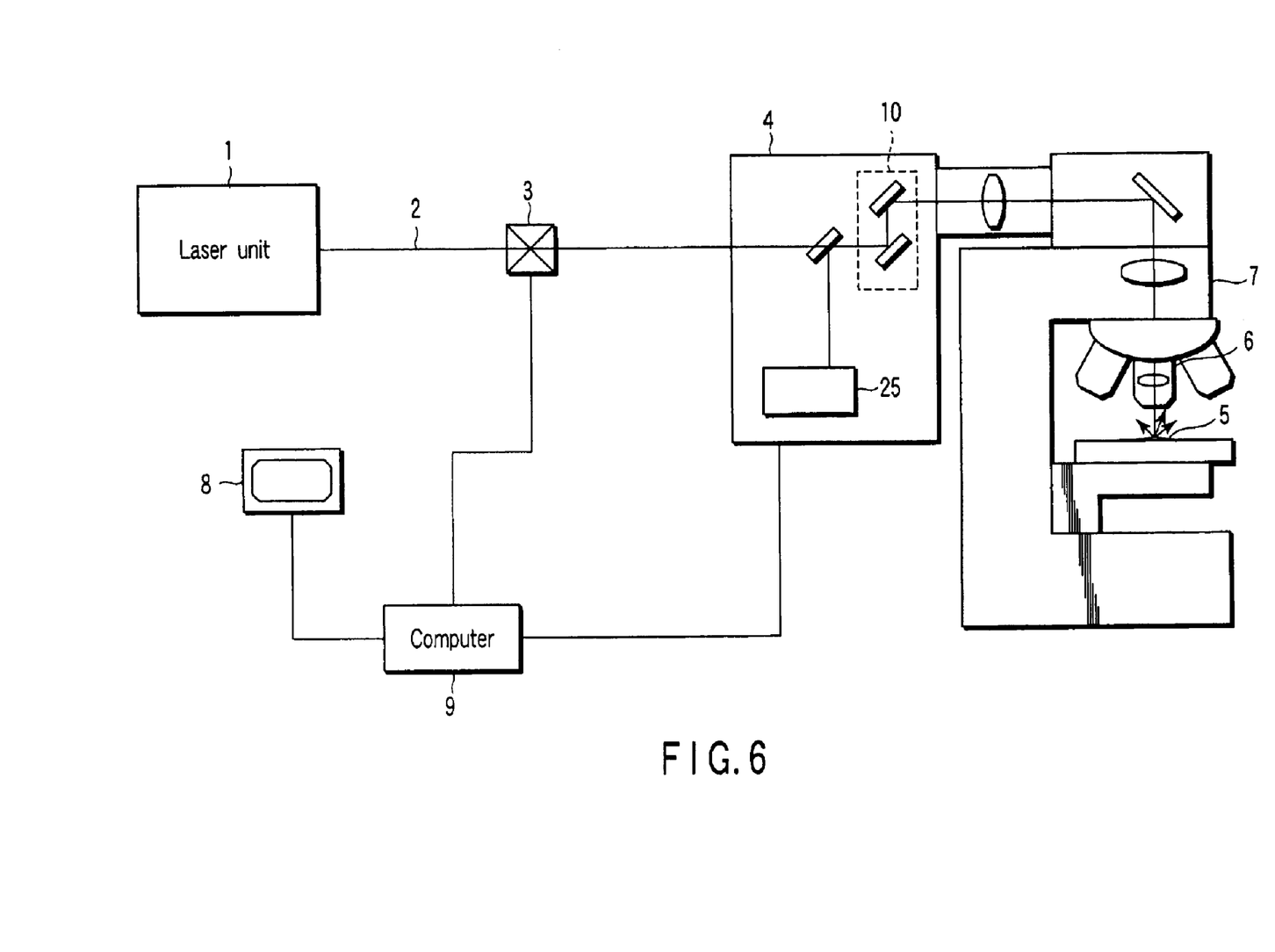
FIG. 6 is a block diagram showing still another embodiment of the laser microscope according to the present invention.
Figure 7:
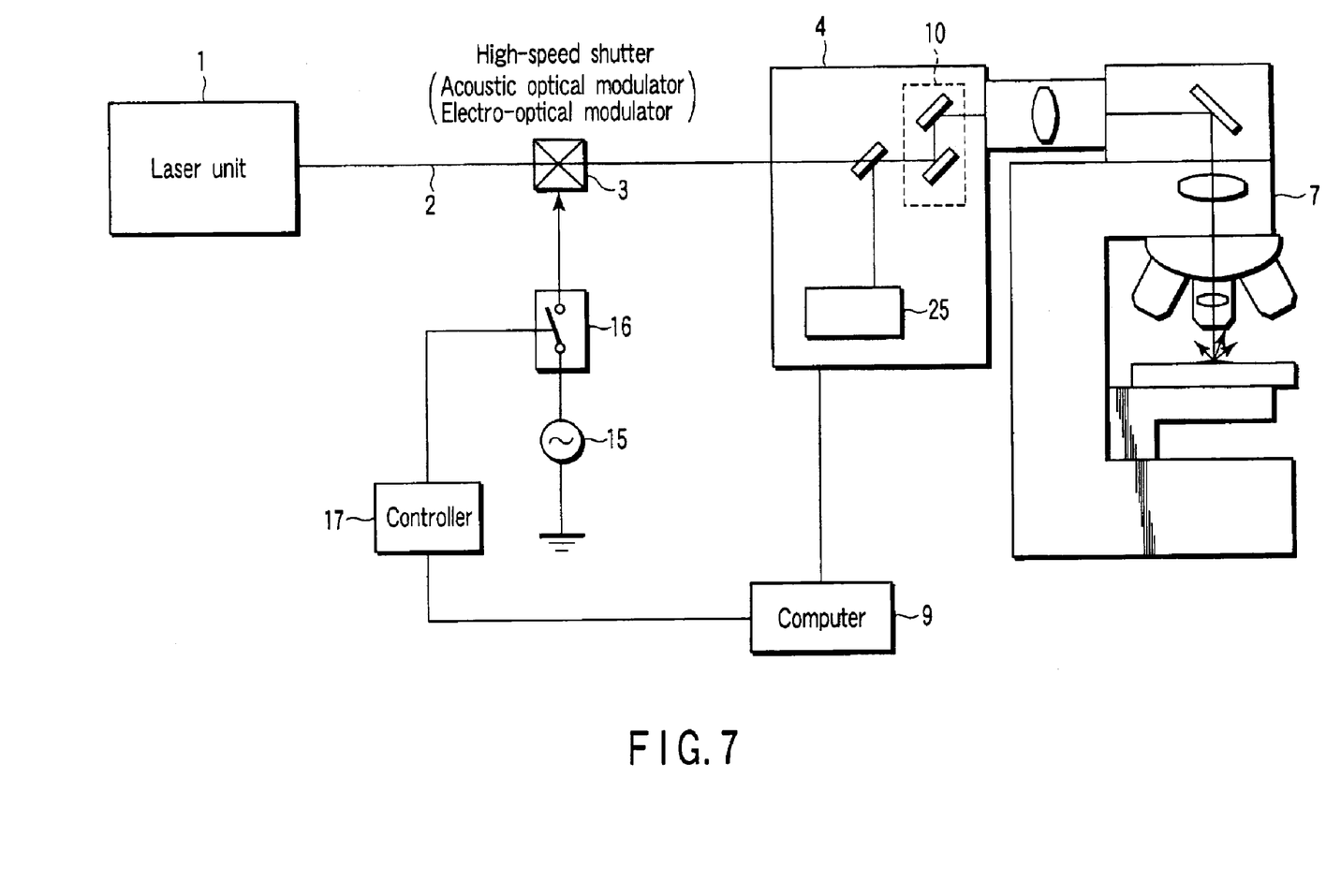
FIG. 7 is a block diagram showing still another embodiment of the laser microscope according to the present invention.

The laser microscope of any of the first to third embodiments detects fluorescence generated from a specimen 5. The laser microscope of the fourth embodiment detects Raman scattering light generated from a specimen 5 and SHG (Second Harmonic Generation).

FIGS. 6 and 7 are block diagrams showing the fourth embodiment of the laser microscope according to the present invention. This laser microscope of the fourth embodiment uses a photoelectric detector 25 capable of spectral detection, instead of the photoelectric detector 11 used in the laser microscopes shown in FIGS. 1 and 4.

Raman scattering light contains a plurality of wavelengths. Therefore, the photoelectric detector 25 is formed by combining a dispersion device and photoelectric converter. The dispersion device disperses incident light, and the photoelectric converter measures the intensity of light of each wavelength. The photoelectric detector 25 outputs a measurement value signal to a computer 9.

Note that Raman scattering light detected in the fourth embodiment can be generated by multi-photon excitation or single-photon excitation.

The computer 9 relates a signal representing the operating state of a galvanometer mirror 10 to the signal from the photoelectric detector 25. For example, the computer 9 divides an observation region into small regions from which 800×600=480,000 data are sampled. The computer 9 stores the signal from the photoelectric detector 25 in a storage area corresponding to each small region. The computer 9 then edits the signal from the photoelectric detector 25 and displays the edited signal as an image on a monitor 8.

Although the computer 9 generates an image in this embodiment, the computer 9 may also acquire spectral data of each small region, generating or not generating an image. When an image is to be generated, 800×600 small regions correspond to pixels.

Note that the pulse control methods shown in FIGS. 2 and 3 are also applicable to the laser microscope of the fourth embodiment. In the fourth embodiment, the number of laser pulses may also be controlled not for each pixel but for each small region, i.e., for a plurality of pixels. This control operation is the same as described above, so a detailed explanation thereof will be omitted.

In the fourth embodiment, not only fluorescence but also Raman scattering light and second harmonic generation (SHG) can be detected.

As described above, each embodiment makes it possible to efficiently obtain multi-photon excitation light even when a laser beam is attenuated, and to observe live cells by lowering the laser beam intensity so as not to give any damages to the cells.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A laser microscope comprising:
   a pulse laser which generates irradiation light having a pulse string;
   a laser scanner which irradiates a specimen by scanning the irradiation light on the specimen;
   a detector which detects emitted light generated from the specimen;
   a shutter which is inserted in an optical path of the irradiation light, and intercepts and transmits the irradiation light for a time period shorter than a scanning time during which a small region on the specimen is scanned, wherein the detector obtains a light amount for each scanning time; and
   a controller which controls the shutter to intercept a predetermined number of pulses of the pulse string of the irradiation light for each scanning time.

2. A microscope according to claim 1, wherein
   the controller comprises a division controller which divides the scanning time into a plurality of partial times, and which controls the shutter to intercept a predetermined number of pulses of the pulse string of the irradiation light for each partial time, and
   the detector obtains the light amount for each scanning time based on an amount of the emitted light generated for each partial time by the irradiation light transmitted through the shutter.

3. A microscope according to claim 2, wherein the shutter comprises one of an acoustic optical modulator and an electro-optical modulator.

4. A microscope according to claim 1, wherein the shutter comprises one of an acoustic optical modulator and an electro-optical modulator.

5. A microscope according to claim 1, wherein the emitted light detected by the detector is one of multi-photon excitation fluorescence Raman scattering light and SHG.

6. A microscope according to claim 2, wherein the emitted light detected by the detector is one of multi-photon excitation fluorescence Raman scattering light and SHG.

7. A microscope according to claim 1, which further comprises a display which generates and displays an image of the specimen by using an output from the detector.

8. A microscope according to claim 2, which further comprises a display which generates and displays an image of the specimen by using an output from the detector.

9. A laser microscope comprising:
   a pulse laser which generates irradiation light having a pulse string;
   a laser scanner which irradiates a specimen by scanning the irradiation light on the specimen;
   a detector which detects multi-photon excitation fluorescence generated from the specimen by the irradiation light;
   a display which displays a fluorescent image of the specimen based on the multi-photon excitation fluorescence;
   a shutter which is inserted in an optical path of the irradiation light, and intercepts and transmits the irradiation light for a time period shorter than a one-pixel scanning time during which one pixel of the fluorescent image is scanned; and
   a controller which controls the shutter to intercept a predetermined number of pulses of the pulse string of the irradiation light for each one-pixel scanning time.

10. A microscope according to claim 9, wherein
    the controller comprises a division controller which divides the one-pixel scanning time into a plurality of partial times, and which controls the shutter to intercept a predetermined number of pulses of the pulse string of the irradiation light for each partial time, and
    the laser microscope further comprises an image forming unit which obtains a fluorescence amount for each one-pixel scanning time based on a fluorescence amount generated for each partial time by the irradiation light transmitted through the shutter, and forms the fluorescent image of the specimen.

11. A microscope according to claim 10, which further comprises:
    a dichroic mirror inserted in an optical path between an objective lens of the laser microscope and the laser scanner, and
    a photoelectric detector which detects the fluorescence generated from the specimen via the dichroic mirror.

12. A microscope according to claim 11, wherein the shutter comprises one of an acoustic optical modulator and an electro-optical modulator.

13. A microscope according to claim 12, wherein the laser microscope is a multi-photon laser excitation microscope.

14. A microscope according to claim 9, which further comprises:
    a dichroic mirror inserted in an optical path between an objective lens of the laser microscope and the laser scanner, and
    a photoelectric detector which detects the fluorescence generated from the specimen via the dichroic mirror.

15. A microscope according to claim 14, wherein the shutter comprises one of an acoustic optical modulator and an electro-optical modulator.

16. A microscope according to claim 15, wherein the laser microscope is a multi-photon laser excitation microscope.

17. A microscope according to claim 9, wherein the shutter comprises one of an acoustic optical modulator and an electro-optical modulator.

18. A microscope according to claim 17, wherein the laser microscope is a multi-photon laser excitation microscope.

19. A microscope according to claim 9, wherein the laser microscope is a multi-photon laser excitation microscope.

20. A laser irradiating method of a laser microscope comprising a pulse laser which generates irradiation light having a pulse string, a laser scanner which irradiates a specimen by scanning the irradiation light on the specimen, a detector which detects fluorescence generated from the specimen by the irradiation light, and a display which displays a fluorescent image of the specimen based on the fluorescence, comprising:
    a control step of controlling an operation of a shutter which is inserted in an optical path of the irradiation light, and intercepts and transmits the irradiation light for a time period shorter than one-pixel scanning time during which one pixel of the fluorescent image is scanned, thereby irradiating the specimen with a laser having a predetermined number of pulses of the pulse string of the irradiation light for each one-pixel scanning time.

21. A laser microscope comprising:
    a pulse laser which generates irradiation light having a pulse string;

laser scanning means for irradiating a specimen by scanning the irradiation light on the specimen;

detecting means for detecting fluorescence generated from the specimen by the irradiation light;

display means for displaying a fluorescent image of the specimen based on the fluorescence;

shutter means inserted in an optical path of the irradiation light to intercept and transmit the irradiation light for a time period shorter than a one-pixel scanning time during which one pixel of the fluorescent image is scanned; and control means for controlling the shutter means to intercept a predetermined number of pulses of the pulse string of the irradiation light for each one-pixel scanning time.

* * * * *